(12) United States Patent
Beil et al.

(10) Patent No.: US 8,143,536 B2
(45) Date of Patent: Mar. 27, 2012

(54) SWITCH

(75) Inventors: Theo Beil, Meßkirch (DE); Ralf Siegler, Schlier (DE); Axel Mueller, Berg (DE)

(73) Assignee: Rafi GmbH & Co., KG, Berg (DE)

( * ) Notice: Subject to any disclaimer, the term of this patent is extended or adjusted under 35 U.S.C. 154(b) by 257 days.

(21) Appl. No.: 12/590,523

(22) Filed: Nov. 10, 2009

(65) Prior Publication Data

US 2010/0155208 A1   Jun. 24, 2010

(30) Foreign Application Priority Data

Nov. 10, 2008   (DE) .................. 10 2008 056 566

(51) Int. Cl.
*H01H 9/00* (2006.01)
(52) U.S. Cl. ........................... 200/5 R; 200/6 A; 200/18
(58) Field of Classification Search .................. 200/5 R, 200/6 A, 17 R, 18
See application file for complete search history.

(56) References Cited

U.S. PATENT DOCUMENTS

| | | | | |
|---|---|---|---|---|
| 5,844,182 A * | 12/1998 | Hirano et al. | ................. | 200/5 R |
| 6,252,183 B1 * | 6/2001 | Shirai | ........................... | 200/5 R |
| 6,515,241 B2 * | 2/2003 | Saiki | ........................... | 200/5 R |
| 6,759,606 B2 * | 7/2004 | Fortuny Riera | ............... | 200/5 R |
| 6,765,165 B1 * | 7/2004 | Torrens | ........................ | 200/512 |
| 6,897,391 B2 * | 5/2005 | Gavalda | ........................ | 200/512 |
| 6,998,546 B1 * | 2/2006 | Schmidt et al. | ............... | 200/5 R |
| 7,368,673 B2 * | 5/2008 | Sato | ............................ | 200/5 R |
| 2002/0104742 A1 * | 8/2002 | Novelle et al. | ................ | 200/5 R |
| 2004/0144628 A1 * | 7/2004 | Sottong | ........................ | 200/5 R |

FOREIGN PATENT DOCUMENTS

EP    1 258 895    11/2002
FR    2 761 021     9/1998

* cited by examiner

*Primary Examiner* — Michael Friedhofer
(74) *Attorney, Agent, or Firm* — Pandiscio & Pandiscio (57) ABSTRACT

A switch (1) for converting mechanically generated movements into electrical switching signals, consisting of a cover (2) and a carrier plate (3) at a distance from one another and fixedly connected together, a switching element (4) that can be moved to a limited extent relative to the cover (2) and be actuated by one or more pushbuttons (5) facing the carrier plate (3), by means of which the particular adjustment movements of the switching element (4) can be measured and are converted into switching signals, the movement direction of the switching element (4) should be being perceived as the movement direction of an object, in particular a vehicle seat, and the switch (1) can be operated in at least six different movement directions.

17 Claims, 8 Drawing Sheets

SWITCH

The invention relates to a switch for converting mechanically generated movements into electrical switching signals in accordance with the pre-characterising clause of patent claim 1

Switches of this kind are often used in motor vehicles, for example as window regulators or for adjusting the seats. Normally, the switching element that is held on a pin in the cover of the switch can be swivelled into two positions, with the effect that two different switching signals can be generated. If, therefore, the switching element is pressed forwards then the seat base is moved in the direction of the steering wheel and if the switching element is pressed backwards then the seat base is moved in the direction of the rear seat bench.

It has proven to be a disadvantage with these switches that one switch has to be provided for each movement direction. However, because the seat adjustment has got to be adapted to the individual conditions, it is not only necessary to set the distance from the seat base to the steering wheel but also the inclination of the backrest, the curvature of the backrest, the angle of the seat base in relation to the horizontal plane as well as the height that the seat base should be positioned at in relation to the floor of the vehicle.

Furthermore, the switches of prior art can only be pressed or moved to two switching positions, namely forwards and backwards. The movement direction of the switching element in this case often does not correspond to the actual movement direction of the seat that is to be adjusted, with the effect that users have to experiment with switches of this kind in order to establish which switching direction corresponds to the desired movement direction of the seat that is to be adjusted.

Due to the large number of switches that have to be provided, their operation is complicated and often leads to considerable confusion amongst users until they are able to find out which switches need to be operated in order to achieve which movement direction of the seat position.

It is therefore a task of the present invention to provide a switch of the aforementioned kind by means of which three or more different movement directions can be implemented, for example in order to adjust the a seat in a motor vehicle, and in which it is guaranteed that the particular switching position that is selected is allocated exactly to a movement direction of the object to be moved, in particular a seat.

These purposes are achieved by the features that are listed in the characterising part of patent claim 1.

Other advantageous further embodiments of the invention are disclosed on the subordinate claims.

The actuator plate can be both moved axially and swivelled in the guide groove that is worked into the carrier plate by means of the lever arm and the transmission element, therefore the manual mechanical movements adopted by the switching element can, for example, be allocated to the corresponding movement direction of a vehicle seat. Each actuation direction of the switching element in this case is exactly allocated to the movement direction of the object to be adjusted, in particular a vehicle seat, with the effect that the corresponding user of the switch can operate the vehicle seat adjustment function without the need for trial and error.

It is particularly advantageous for blocking elements to be provided, which are connected in a non-positive manner to the actuator plate and the carrier plate, because this guarantees that, when the actuator plate is deflected to a certain switching position, the actuator plate is blocked in other movement directions. The actuator plate can only be guided back from a switching position into the initial position.

The pushbuttons facing the carrier plate are arranged offset from one another in such a manner that they are exactly allocated to an advancing movement of the actuator plate, in which case it is guaranteed that the particular movement of the switching element corresponds to the required movement direction of the vehicle seat. The mounting of the actuator plate and therefore of the switching element means that the corresponding adjustment movement of the switching element is perceived as the movement direction of the object to be adjusted.

The drawing shows a sample embodiment configured in accordance with the present invention, the details of which are explained below. In detail.

Figure 1:
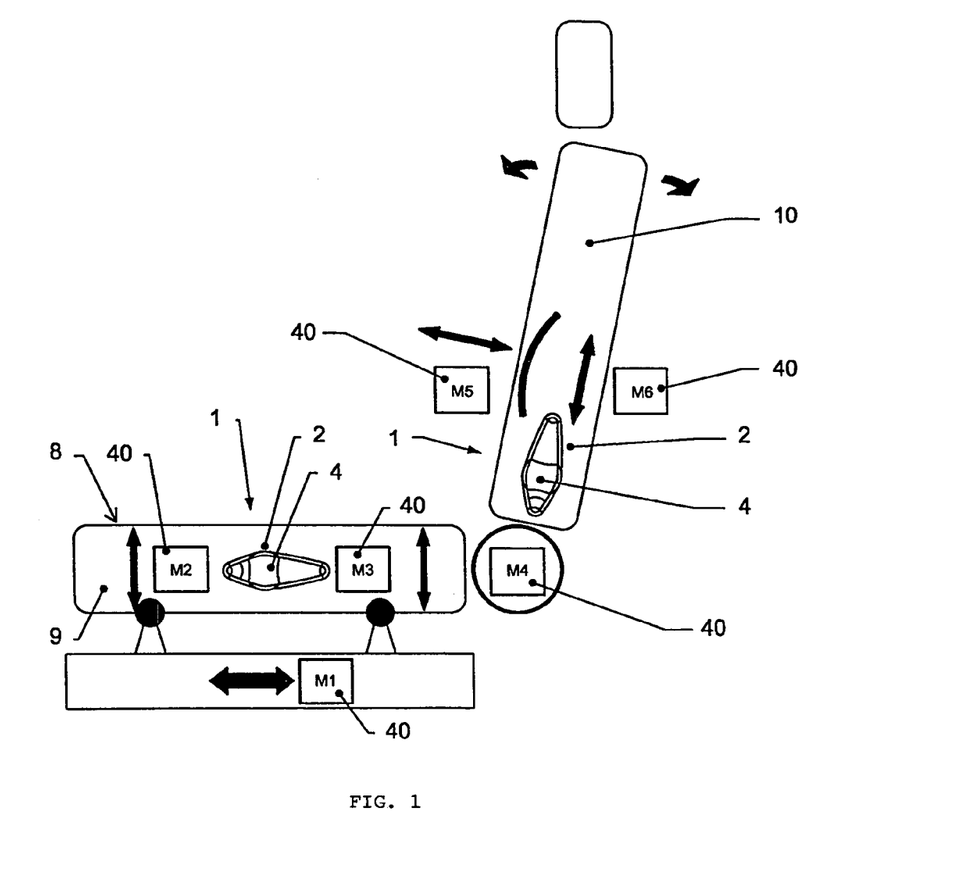
FIG. 1 shows two switches attached to a vehicle seat, by means of which both the seat base and the backrest, as well as their shape, can be adjusted by operating the switches, in a side view.

FIG. 1 shows two switches 1 that are mounted on a vehicle seat 8. The two switches 1 are intended to allow the vehicle seat 8 to be adjusted, and specifically the seat base cushion 9 and its backrest 10, with the result that, for example, the distance from the seat base cushion 9 to the floor of the vehicle can be adjusted to meet individual requirement. The two switches 1 correspondingly convert a mechanically generated advancing movement into electrical switching signals by means of which six drive motors 40 are controlled.

The drive motors 40 are provided on the vehicle seat 8 in order to adjust the distance from the seat base cushion 9 to the steering wheel of the car, the height of the vehicle seat 8 above the floor of the vehicle, the angle of the seat base cushion 9 in relation to the horizontal plane. These three adjustment options of the vehicle seat 8 are adopted by one of the two switches 1.

The second switch 1 is allocated to the backrest 10 of the vehicle seat 8, by means of which the three other drive motors 40 are controlled in order to allow the angle of the backrest 10, the curvature of the backrest 10 and the height position of the backrest 10 in relation to the seat base cushion 9 to be adjusted.

Figure 2:
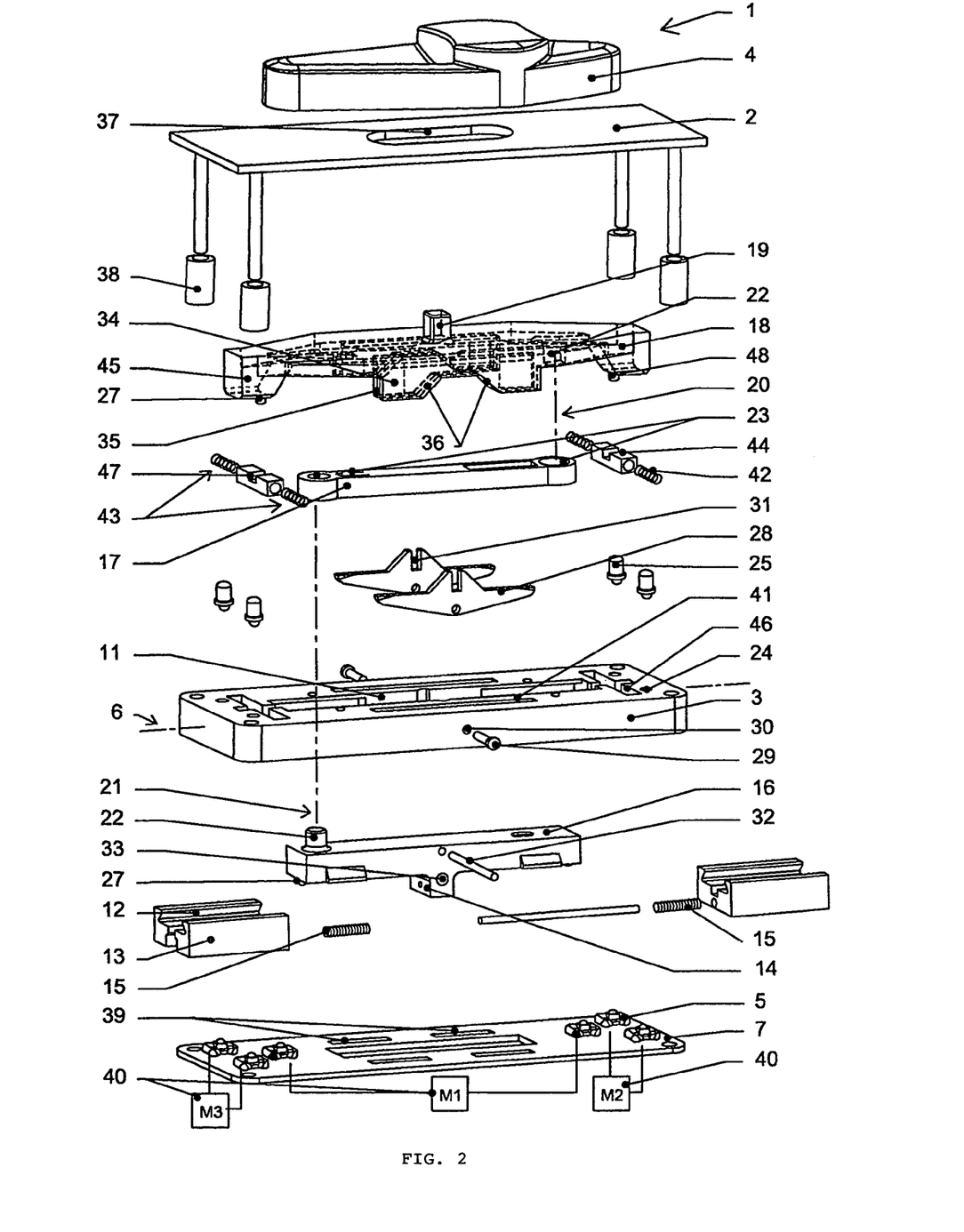
FIG. 2 shows one of the switches in accordance with FIG. 1, in a perspective view and in the pre-assembled condition.
Figure 3:
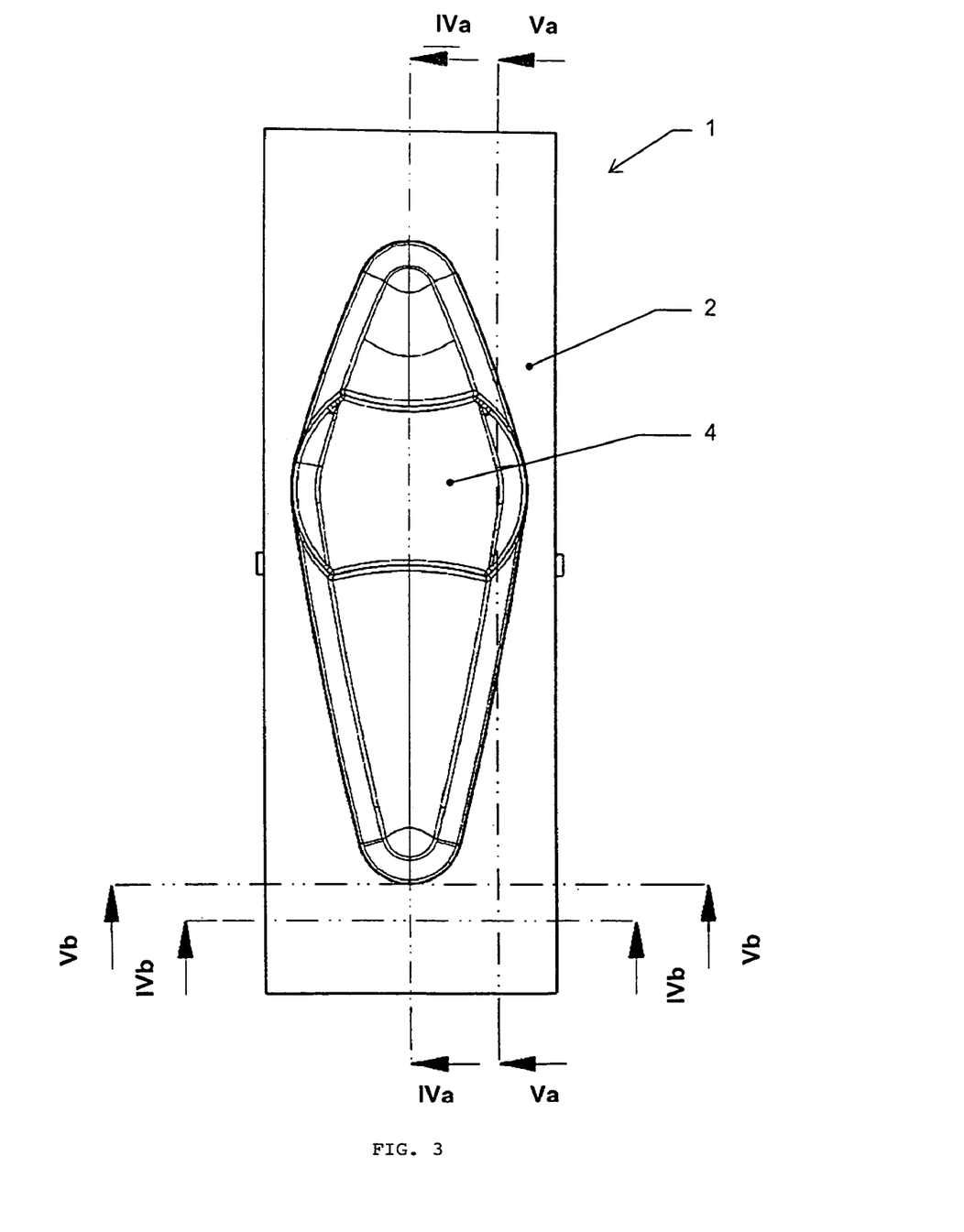
FIG. 3 shows the switch in accordance with FIG. 1, in a magnified view, in the assembled condition and in a front view.

FIG. 2 shows the components that make up the switch 1. In this case, a cover 2 is connected to a carrier plate 3 at a distance by means of spacer sleeves 38, with the effect that there is an air gap between the cover 2 and the carrier plate 3. In the mounted position, the cover 2 and the carrier plate 3 run in parallel with one another. A switching element 4 in the form of a handle is provided on the outside of the cover 2 in order to allow the switch 1 to be operated. The switching element runs parallel to the longitudinal axis 6 of the carrier plate 3. The installation and mounting of the switching element 4 are explained in more detail below.

A circuit board 7 is mounted on the outside of the carrier plate 3 and has six pushbuttons 5 arranged on it in various positions. The pushbutton 5 therefore enables a switching signal to be generated which is used for controlling the corresponding drive motor 40. The adjustment of the switching element 4 therefore causes a certain pushbutton 5 triggering.

A guide groove 11 is worked into the carrier plate 3 and is aligned in parallel to the longitudinal axis 6. Two guide slides 13 are inserted in the longitudinal direction of the guide groove 11 and are secured in this. Guide channels 12 with a dovetailed profile are worked into both guide slides 12. The guide slides 13 are securely inserted in the guide channels 12 and have a guide channel 12 with a transmission element 16 inserted in it in a mobile arrangement in alignment with the longitudinal axis 6 of the carrier plate.

A collar 14 is formed onto the underside of the transmission element 16 facing the circuit board 7, which is consequently arranged between the two guide slides 13. A compression spring 15 is provided between the collar 14 and the each of the guide slides 13. The two compression springs 15 therefore hold the transmission element 16 clamped centrally in the guide groove 11. When the transmission element 16 is moved axially in the guide groove 11, one of the two compression springs 15 is compressed, namely the one that has the transmission element 16 pushed in its direction. The other of the two compression springs 15, on the other hand, is extended; once the manual actuating force acting on the transmission element 16 is released, the transmission element 16 is moved back to the initial position by the two compression springs 15.

A peg 22 formed on the transmission element 16 projects from the level formed by the carrier plate 3, with the effect that an equalisation arm 17 with a hole 23 worked into it can be connected to the peg 22. In this case, the connection between the peg 22 of the transmission element 16 and the hole 23 in the equalisation arm 17 forms a first rotating joint, the axis of rotation of which is aligned at right angles to the longitudinal axis 6 and the transmission element 16.

Another hole 23 is provided in the equalisation arm 17 opposite to the rotating joint 21 and has a peg 22 formed on an actuator plate 18 pushed into it, meaning that the connection between the peg 22 of the actuator plate 18 and the hole 23 in the equalisation arm 17 forms a second rotating joint 20. The two rotating joints 20 and 21 are located at a distance from one another and their axes of rotation run in parallel to one another.

The surface of the actuator plate 18 facing towards the cover 2 has a peg 19 formed onto it which projects through and out of a slot 37 worked into the cover 2. The switching element 4 has a hole corresponding with and intended for accommodating the rectangular shaped peg 19, with the effect that the switching element 4 is in a form-fitting connection with the actuator plate 18. The mechanical movements adopted by the switching element 4 are therefore transmitted to the actuator plate 18 following the equalisation arm 17, and are passed on from here to the transmission element 16. The peg 19 is arranged at an identical distance from the two rotating joints 20 and 21.

In order for the adjustment movements of the actuator plate 18 to be assigned to the six pushbuttons 5, there are first of all four through-holes 24 worked into the carrier plate 3 with a tappet 25 inserted in each of the through-holes 24. The position of the through-holes 24 in this case corresponds to the four outer pushbuttons 5 on the circuit board 7. If this causes one of the tappets 25 to be moved in the direction of the corresponding pushbutton 5 then it is compressed and this produces an electrical switching signal because a short circuit is created in the pushbutton 5.

Two cams 6 are formed onto the two internal end faces of the guide groove 11 aligned at right angles to the longitudinal axis 6 of the carrier plate 3, and these cams 6 can be moved in the direction of the pushbutton 5 arranged below it. The transmission element 16 has two actuator pegs 27 formed onto it and these act on the cams 16 by the axial advancing movement of the actuator plate 18 and move the cams 16 in the direction of the pushbutton 5 arranged below it with the effect that the pushbutton 5 can be switched electrically. This switching position can be seen in FIGS. 6b and 6c.

In order for the deflection of the actuator plate 18 to be transferred to the axes of rotation 20 and 21, there are two guide slots 41 worked into the carrier plate 3 running in parallel to one another and there is a guide slide 44 inserted into each of the guide slots 41. The two guide slots 41 run at right angles to the longitudinal axis 6 of the carrier plate 3; the guide groove 11 is arranged between these two guide slots 41.

A holding slot 47 aligned in the direction of the actuator plate 18 is worked into both of the guide slots 44, and the free end 45 of the actuator plate 18, in particular the peg 27 protruding from it, is inserted into the holding slot 47, with the effect that the actuator plate 18 is in a form-fitting connection with the guide slide 44.

Openings are worked into the two end faces of the corresponding guide slide 44 that are opposite one another, and a compression spring 42 is pushed into each of the openings, with the opposite end of each spring 42 supported against the end face of the corresponding guide slot 41. The two compression springs 42 form a spring pair 43 by means of which the guide slide 44 is held centrally in the guide slot 41.

Figure 7:
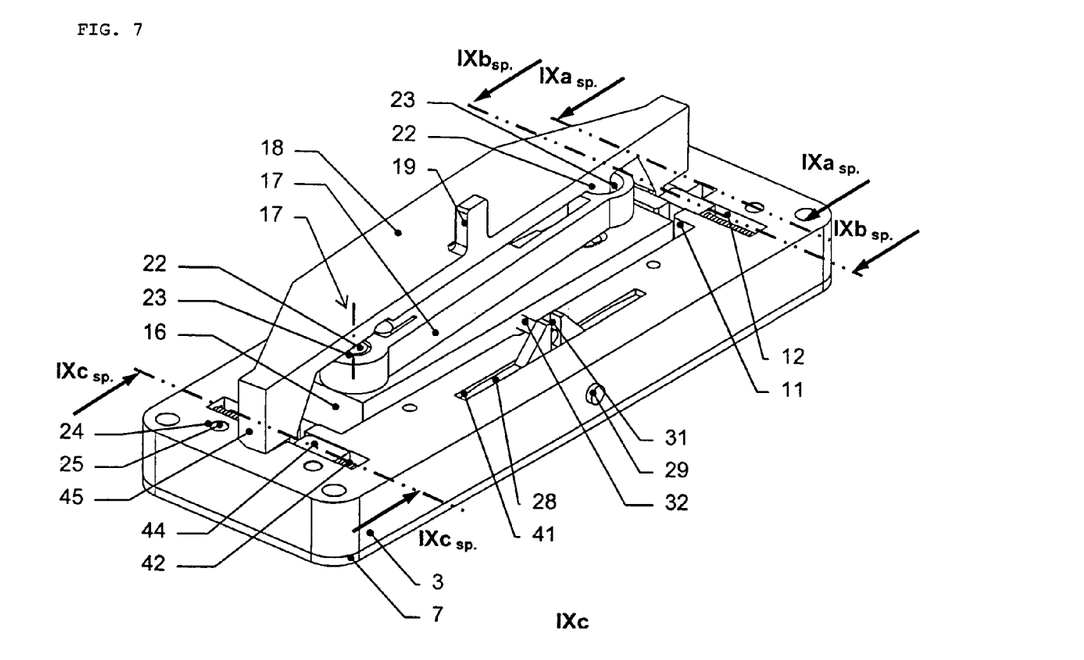
FIG. 7 shows the switch in accordance with FIG. 1, with some components removed and with the switch deflected about a first axis of rotation.
Figure 8:
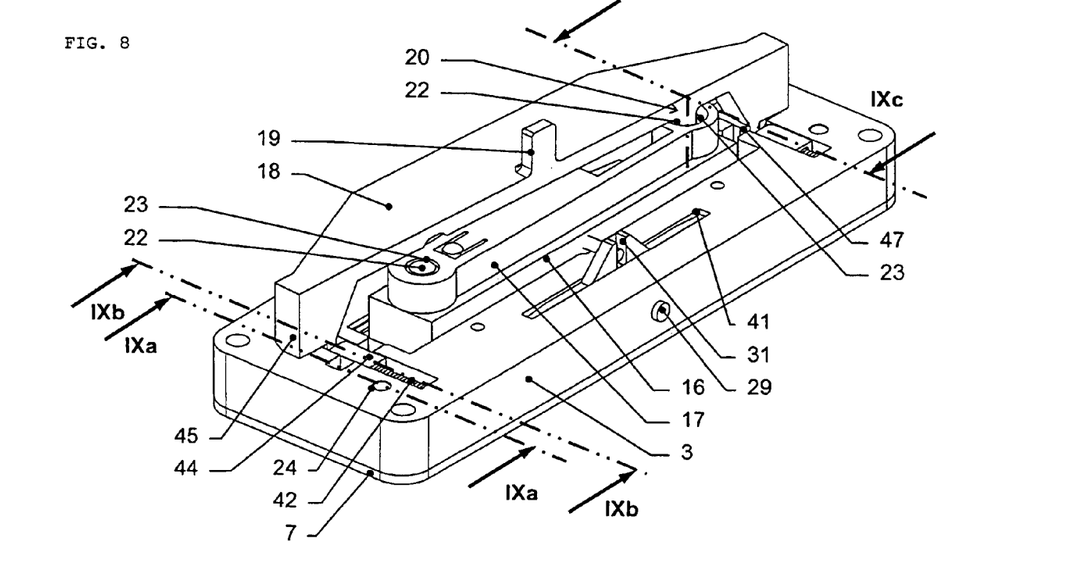
FIG. 8 shows the switch in accordance with FIG. 1, in a perspective view, with the switch deflected about a second axis of rotation.

If the actuator plate 18 is now swivelled in accordance with FIGS. 7 and 8, the guide slide 44 is pressed in the corresponding direction of the power flow so that the opposite compression spring 42 is deflected. The free end 45 of the actuator plate 18 moves over one of the tappets 25 in this case, with the effect that this advancing movement of the tappet 25 actuates the corresponding pushbutton 5. At the same time, the opposite free end 45 of the actuator plate 18 is secured by the opposite spring pair 43 because the opposite free end of the actuator plate 18 is supported centrally in the guide slot 41 by this spring pair 43. As a result, there is only a defined actuation of the required tappet 25. The other tappets 25 remain in their rest position. Securing of the actuator plate 18 in this way is made possible by the two rotating joints 20 and 21, because they enable a relative movement to take place between the actuator plate 18 and the equalisation arm 17 or between the equalisation arm 17 and the transmission element 16.

Two blocking elements 28 arranged parallel to one another are provided in order to block further deflections of the actuator plate 18 in one of the six switch positions, with these blocking elements 28 taking the form of a rocker, which means they are supported in a swivelling arrangement on a pin 29 on the carrier plate and can move to a limited extent. In order not to prevent the deflection of the blocking elements 28, there are four slots 39 worked into the circuit board 7 into which the corresponding blocking element 28 can penetrate depending on the axial movement direction of the actuator plate 18, which is shown in FIG. 6. The pins 29 are held in holding openings 30 that are worked into the carrier plate 3.

Two slots 31 running in alignment with one another are worked into the blocking elements. A guide pin 32 is inserted in the slots 31 and passes through a through-hole 47 worked into the transmission element 16.

There are two cheeks 34 formed on the actuator plate 18 in order to establish a non-positive connection between the blocking elements 28 and the actuator plate 18, with the cheeks 34 projecting in the direction of the blocking element 28. Each of the cheeks 34 has two guide grooves 35 worked into it, that are aligned in parallel with the longitudinal axis 6 of the carrier plate 3. In the installed condition, the two blocking elements 28 are inserted in the guide slots 41 of the carrier plate 3. Furthermore, each of the cheeks has a trapezoidal opening 36 provided in it, in order to avoid preventing the movements of the actuator plate 18 during this movement. This is because the inner contour of the opening 36 is larger than the outer contour of the blocking elements 28.

Figure 4A:
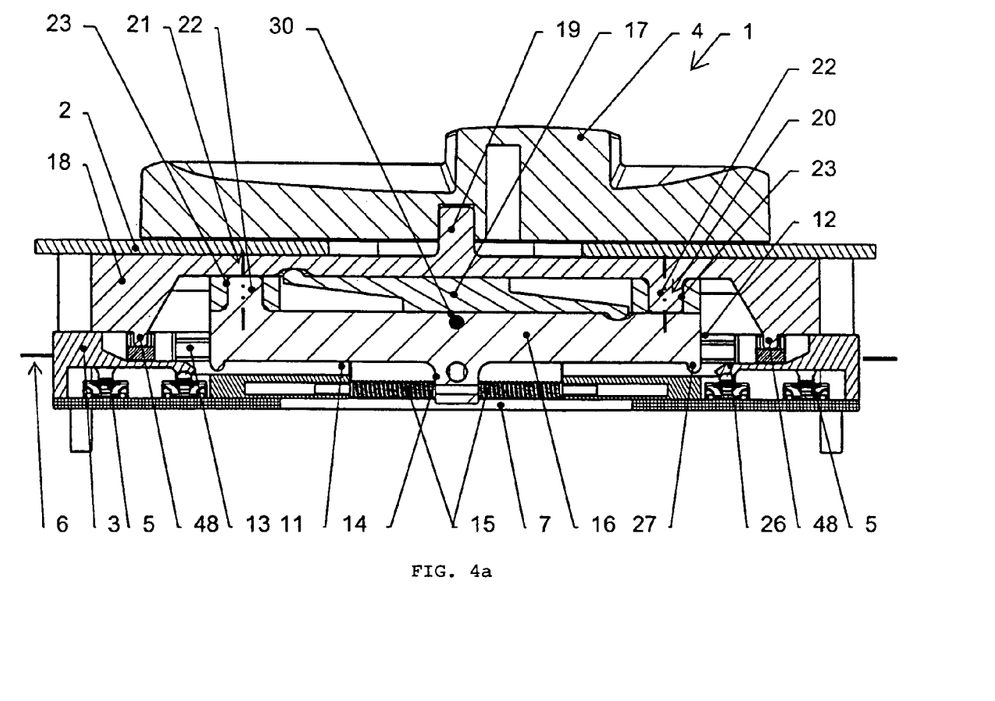
FIG. 4a shows the switch in accordance with FIG. 3, along the section IVa-IVa.
Figure 4B:
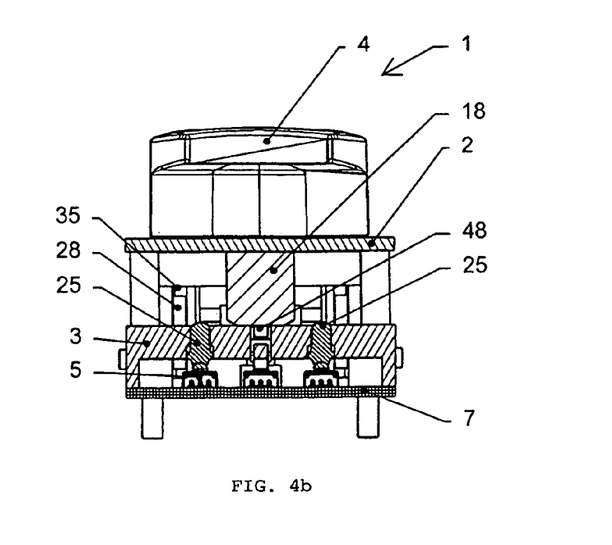
FIG. 4b shows the switch in accordance with FIG. 3, along the section IVb-IVb.

FIGS. 3, 4a, 4b, 5a and 5b show the structure of the switch 1 in the installed condition. FIG. 4b in particular shows that the free end 45 of the actuator plate 18 slides over the end face of the tappet 25 projecting from the carrier plate 3, thereby allowing face to move in the direction of whichever pushbutton 5 is arranged below it in order to generate a switching signal. The axial advancing movement of the cam 26 can also be seen in FIG. 4b, because when the actuator peg 27 formed on the actuator plate 18 is pressed in the direction of the cam 26, the cam 26 can actuated the pushbutton 5 located below it.

Figure 5A:
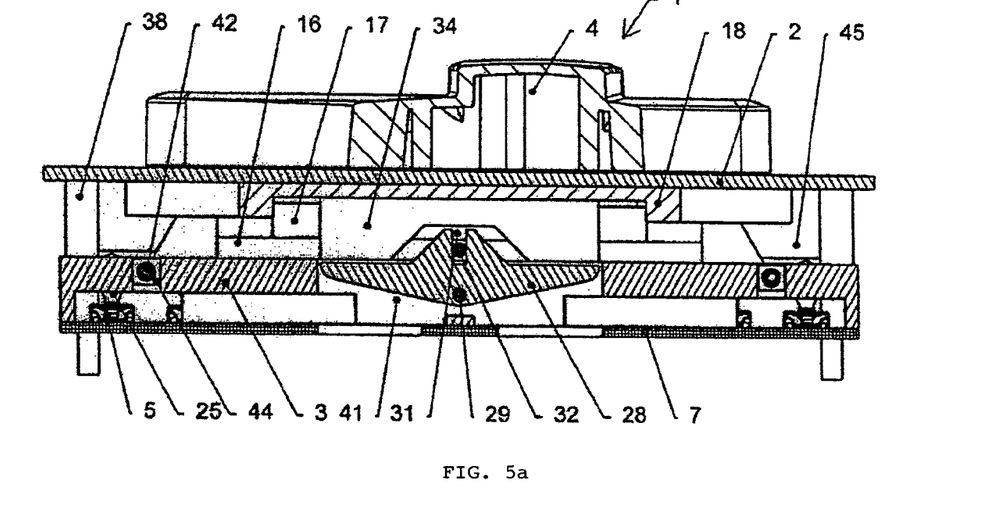
FIG. 5a shows the switch in accordance with FIG. 3, along the section Va-Va.
Figure 5B:
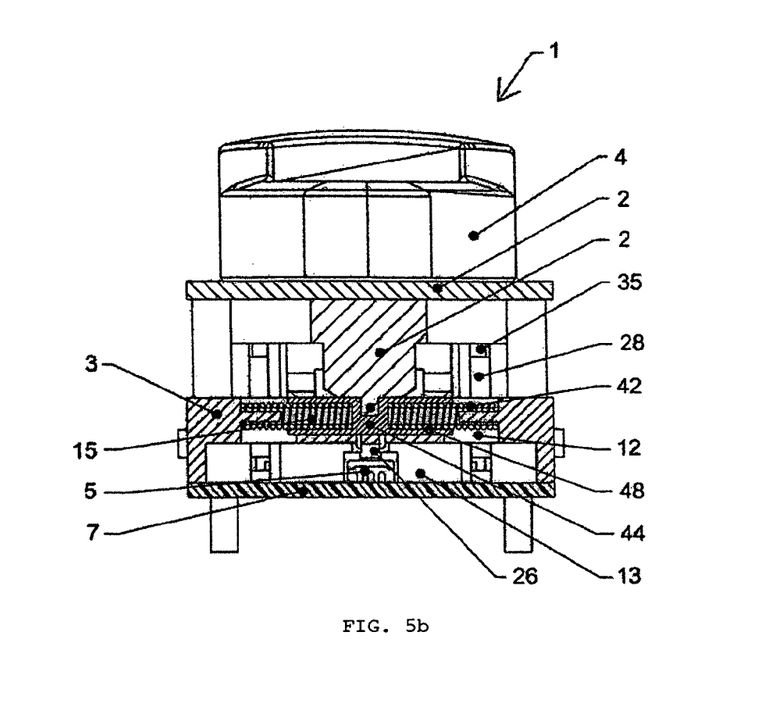
FIG. 5b shows the switch in accordance with FIG. 3, along the section Vb-Vb.

FIG. 5a shows, in particular, the mounting and the deflection of the blocking elements 28 and the manner in which these are pushed into guide slots 41 of the carrier plate 3. The pin 29 inserted in the holding opening 30 in this case runs in parallel with the pin 32 that engages in the two holding slots 31 in the blocking elements 28. If, accordingly, the actuator plate 18 is deflected about one of the two rotating joints 20 or 21 then the actuator plate 18 cannot be moved into any other switching position due to the non-positive connection between it and the two blocking elements 28 as well as the carrier plate 3.

Figure 6A:
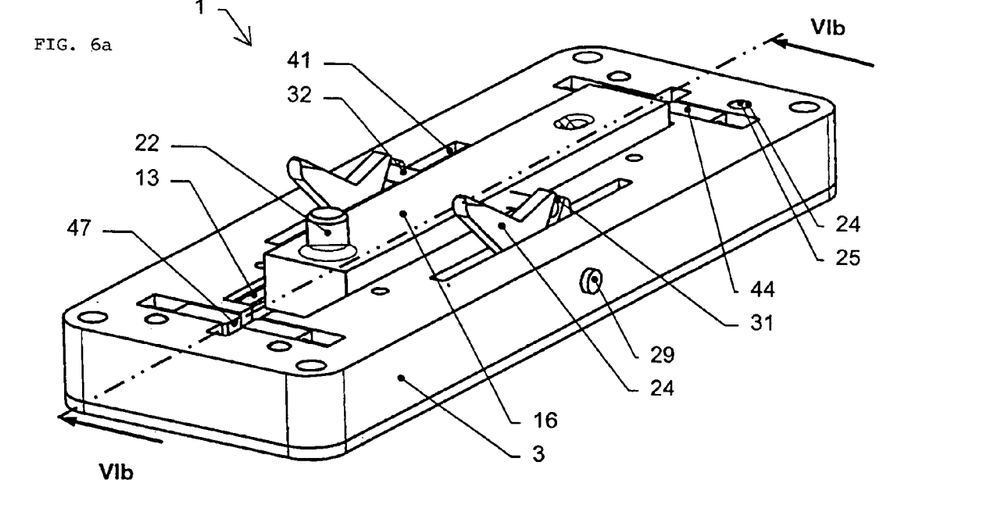
FIG. 6a shows the switch in accordance with FIG. 1, in a perspective view and partially opened, in which case the switch is operated in the form of an axial advancing movement.

FIG. 6a shows how the blocking elements 28 penetrate the guide slots 35 running in parallel with the longitudinal axis 6 during axial movement of the actuator plate 18. This means the blocking elements 28 are swivelled about the pin 29 and penetrate the guide slots 35 with the effect that the blocking elements 28 create a non-positive, i.e. locationally fixed, connection between the actuator plate 18 and the carrier plate 3.

Figure 6B:
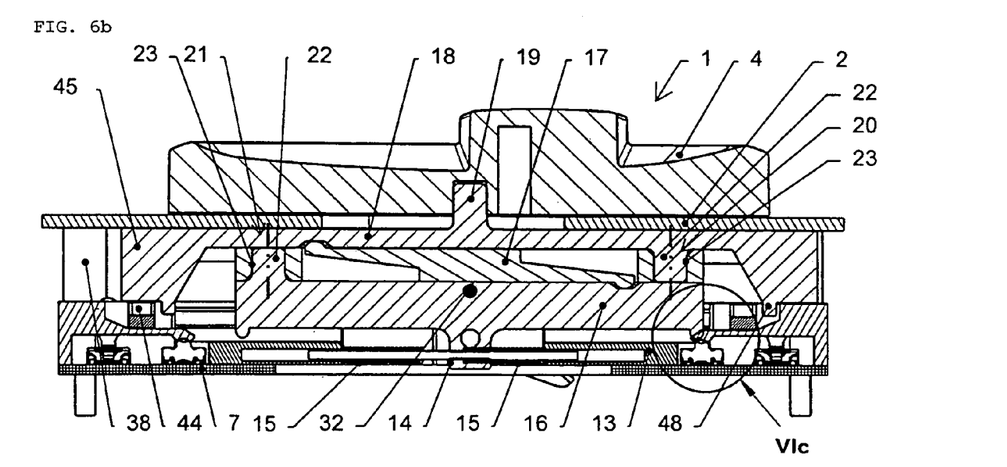
FIG. 6b shows the switch in accordance with FIG. 6a, along the section VIb-VIb.

FIG. 6b shows the deflection of the switch in the axial direction, in which case the right actuator peg 27 of the transmission element 16 shown in FIG. 6b acts on the cam 26 arranged below it on the inside of the guide groove 11 and moves this to the pushbutton 5 arranged below it.

Figure 6C:
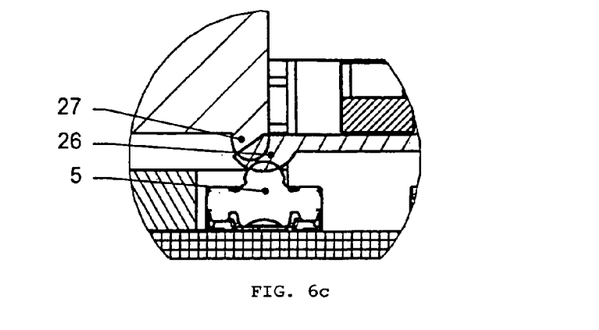
FIG. 6c shows the switch in accordance with FIG. 6b in a magnified view.

FIG. 6c shows the pushbutton 5 and how it can be operated axially by the advancing movement of the cam 26. This is because the pushbutton 5 has two switching contacts that are electrically connected together by a metallic snap disc in the switching position, with the effect that a short circuit is generated and can be used as an electrical switching signal.

FIG. 7 shows how the deflection of the actuator plate 18 takes place about the axis of rotation 21 and, at the same time, how the other opposite free end 45 of the actuator plate 18 is centrally secured by the compression spring pair 43. This is because the guide slide 44 there is secured in its initial position by the two compression springs 42 with the effect that only the other opposite free end 45 of the actuator plate 18 can be moved in the direction of the corresponding tappet 25. The underside of the free end 45 of the actuator plate 18 slides over the end face of the tappet 25 protruding from the carrier plate 3 in this case, and moves the tappet 25 in the direction of the pushbutton 5 arranged below it.

FIG. 7 also shows the relative movement that takes place between the transmission element 16 and the equalisation arm 17 when the actuator plate 18 is swivelled about the axis of rotation 21.

FIG. 8 shows the deflection of the actuator plate 18 about the axis of rotation 20. This means there is a relative movement between the actuator plate 18 and the equalisation arm 17 in order for the equalisation arm 17 to run almost in parallel to the longitudinal axis 6 of the carrier plate 3 and for it not to be deflected from this position due to the actuating force that acts on the actuator plate 18.

Figure 9A:
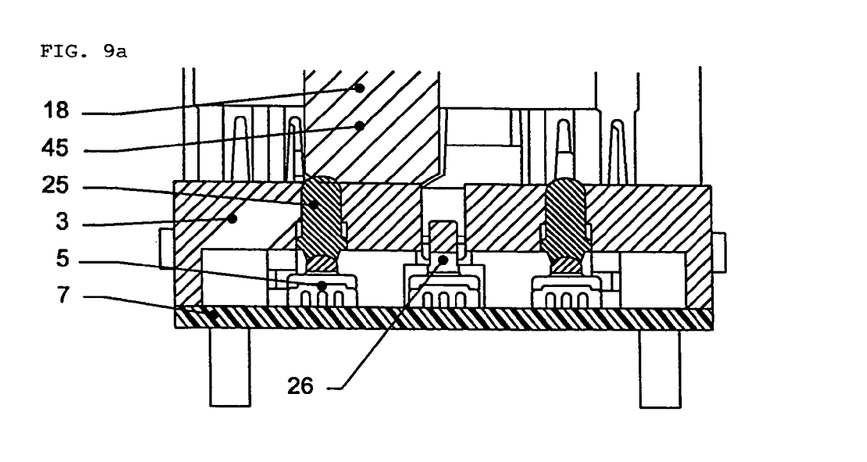
FIG. 9a shows the switch in accordance with FIG. 7, along section IXa-IXa.
Figure 9B:
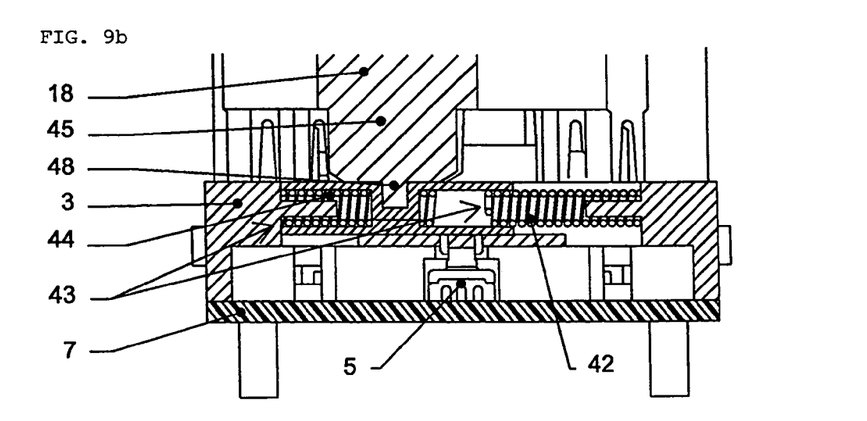
FIG. 9b shows the switch in accordance with FIG. 7, along section IXb-IXb
Figure 9C:
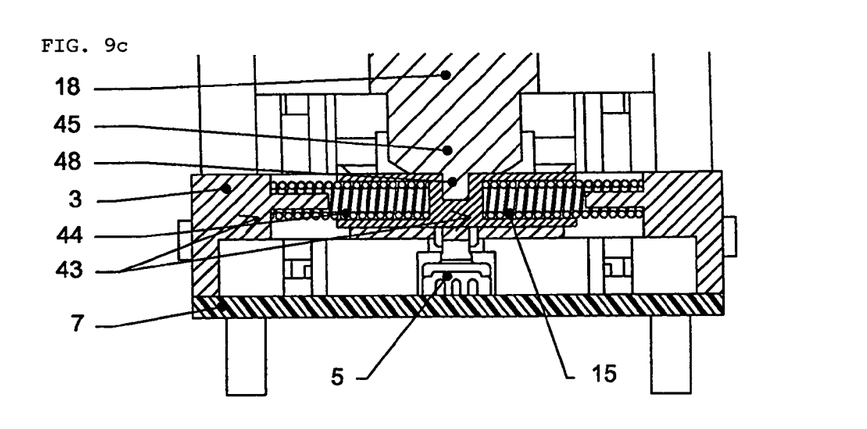
FIG. 9c shows the switch in accordance with FIG. 8, along section IXc-IXc.

FIGS. 9a, 9b and 9c show which deflection angle the actuator plate 18 moves through in the corresponding section plane or the position in which it is centrally fixed as a result of the spring forces acting on the free end 45 of the actuator plate 18 by one of the two spring pairs 23. This position is shown in FIG. 9c in particular.

What is claimed is:

1. A switch for converting mechanically generated movements into electrical switching signals, the switch comprising
a cover (2) and a carrier plate (3) separately from one another and are fixedly connected together, and
a switching element (4) that is movable on said cover (2) and can be actuated from the outside, and one or more pushbuttons (5) facing said carrier plate (3) through which adjustment movements of said switching element (4) can be measured and converted into electrical switching signals,
wherein
a guide groove (11) aligned with and facing said switching element (4) is disposed on said carrier plate (3), and
a transmission element (16) is held in said groove with a limited linear movement, and
said transmission element (16) is provided with an equalisation arm (17) which can be moved in relation to said transmission element (16) in a swivelling manner, and the equalisation arm (17) has an actuator plate (18) attached to it in a swivelling manner, with the actuator plate (18) having a peg (19) passing through said cover (2), on which said switching element (4) is disposed.

2. The switch in accordance with claim 1,
wherein
said transmission element (16) and the equalisation arm (17), and the equalisation arm (17) and the actuator plate (18), are connected together by means of a peg (22) and a hole (23) accommodating the peg (22), by means of which a rotating joint (20, 21) is formed in each case, and the axes of rotation (20', 21') of the rotating joints (20, 21) are located separated from one another and are aligned at right angles to the said carrier plate (3).

3. The switch in accordance with claim 2,
wherein the peg (19) of the actuator plate (18) is arranged between the two rotating joints (20, 21) and is preferably arranged centrally in relation thereto.

4. The switch in accordance with claim 1,
wherein
two guide channels (46) are disposed in the carrier plate (3), and the guide channels (46) run at right angles to a longitudinal axis (6) of said carrier plate (3), and the guide groove (11) is arranged between the two guide channels (46).

5. The switch in accordance with claim 4,
wherein
two compression springs (42) are inserted each into one of the guide channels (46), and extend in alignment with one another, and jointly form a spring pair (43) between which a corresponding free end (45) of the actuator plate (18) is clamped.

6. The switch in accordance with claim 5,
wherein
said transmission element (16) and the equalisation arm (17) are arranged between the two spring pairs (43).

7. The switch in accordance with claim 5,
wherein
a guide slide (44) is inserted in the corresponding guide channel (46) with a restricted range of linear movement, with the guide slide (44) having a holding opening disposed in both of its opposite end faces in order to support one of the compression springs (42), and a surface of the guide slide (44) facing the actuator plate (18) is provided with a holding slot (47), into which a free end of the actuator plate (18) engages and is held in a form-fitting arrangement.

8. The switch in accordance with claim 4,
wherein
said carrier plate (3) is provided with four through-holes (24) therein at right angles to a longitudinal axis (6) of said carrier plate (3), with one tappet (25) inserted in each of the through-holes (24), a first face end of which faces the actuator plate (18) and a second face end of which faces one of the pushbuttons (5).

9. The switch in accordance with claim 4,
wherein
a cam (26) is formed onto the two end faces of said guide groove (11) running at right angles to the longitudinal axis (6) of the carrier plate (3), with the cam (26) projecting into the guide groove, and two actuator pegs (27) facing said cams (26) and oriented in alignment with said cams in the mounted condition are attached to said transmission element (16), by means of which actuator pegs (27) the particular cam (26) can be moved axially in the direction of one of the pushbuttons (5) when the actuator plate (18) is moved in a linear direction.

10. The switch in accordance with claim 1,
wherein
said pushbuttons (5) are mounted on a circuit board (7), such that when the actuator plate (18) is moved, the pushbuttons (5) are actuated in the form of an axial advancing movement by one of the actuator plate (18), and the transmission element (16), depending on the movement direction or the rotational movement of the actuator plate (18).

11. The switch in accordance with claim 1,
wherein
a guide slot (41) is disposed in said carrier plate (3) on each side thereof adjacent said guide groove (11) and adjacent parallel to said guide groove, with a locking element (28) formed as a rocker disposed in each of the guide slots (41), and is held in a swivelling arrangement on said carrier plate (3) by a pin (29).

12. The switch in accordance with claim 11,
wherein
a slot (31) extending in the direction of the actuator plate (18) is disposed in each of the locking elements (28), with a guide pin (32) extending into said slot (31), and two parallel cheeks (34) on opposite sides of a surface of the actuator plate (18) carrier plate (3), and a guide groove (35) is disposed in each of the cheeks (34) in parallel to the longitudinal axis (6) of the actuator plate (18), the locking elements (28) each being insertable into one guide grooves (35) in mounted condition, and a trapezoidal opening (36) is disposed in each of the cheeks (34), an inner contour of which is larger than the outer contour of an locking elements (28).

13. The switch in accordance with claim 12,
wherein
slots (41) in said carrier plate (3) is in alignment with one of the two guide grooves (35) of the cheeks (34), with the locking elements (28) engaging in the slots (41) as a function of a movement direction of said switching element (4).

14. The switch in accordance with claim 1,
wherein
two guide slides (13) are disposed in a fixed location in the guide groove (11), and two guide channels (12) parallel to the longitudinal axis (6) of the carrier plate are disposed in of the guide slides (13), and said transmission element (16) is disposed in the guide channels (12) and is held in a movable arrangement in the guide channels.

15. The switch in accordance with claim 14,
wherein
a collar (14) is aligned at right angles to the longitudinal axis (6) of said carrier plate (3) and is formed on said transmission element (16), with compression springs (15) extruding parallel to the longitudinal axis (6) of said carrier plate (3) in contact with the collar (14) and is supported against the collar, and the compression springs (15) hold said transmission element (16) clamped between the collar (14) and a corresponding end of the carrier plate (3).

16. The switch in accordance with claim 1,
wherein
said pushbuttons (5) are electrically connected to a circuit board (7) and switch signals transferred from said pushbuttons (5) are received by the circuit board (7) and are used in an electric motor, for adjusting a seat (8, 9, 10) in a vehicle.

17. The switch in accordance with claim 1,
wherein
said switching element (4) can be moved to a plurality of switch positions, and one of said pushbuttons (5) is assigned to each switch position, and movement of said switching element (4) into the other switch positions is blocked when one of the plurality switching positions is reached.

* * * * *